Nov. 8, 1955     D. C. FUREY     2,722,915
PEN-HOLDER
Filed June 2, 1953
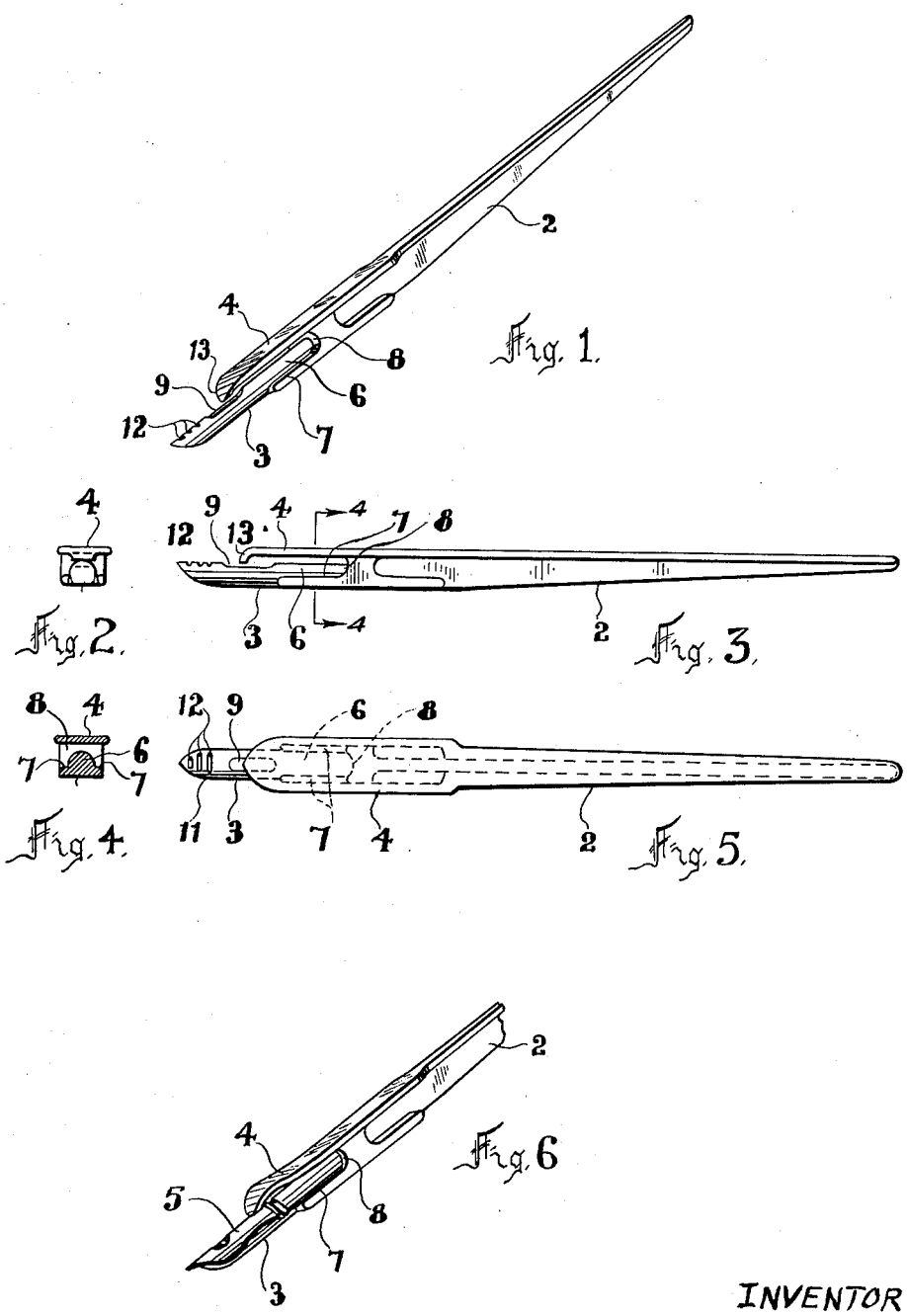
INVENTOR
DILLON C. FUREY
BY *[signature]* ATTY.

United States Patent Office 2,722,915
Patented Nov. 8, 1955

2,722,915

PEN-HOLDER

Dillon Charles Furey, Melbourne, Victoria, Australia

Application June 2, 1953, Serial No. 359,002

Claims priority, application Australia April 7, 1953

2 Claims. (Cl. 120—98)

The object of this invention is to provide pen-holders embodying features of design and construction which render them superior to those previously known or used, more particularly with regard to such matters as minimising the cost of manufacture, facilitating insertion and withdrawal of pen-nibs, promoting a correct and comfortable fingergrip for writing, preventing the pen from rolling when laid upon a flat surface and providing a durable and efficient article of novel and pleasing appearance.

The foregoing and various other objects and advantages of the invention and the salient features thereof will be readily appreciated from the following description, aided by reference to the accompanying drawings in which Fig. 1 is a perspective view of a preferred form of the invention;

Fig. 2 is a front end view;

Fig. 3 is a side elevation;

Fig. 4 is a cross section on line 4—4 of Fig. 3;

Fig. 5 is a plan view; and

Fig. 6 is a perspective view of the forepart of the holder with a nib in writing position.

The improved holder includes a main part or stock 2 of appropriate size and shape and which may advantageously be of T shape in cross section and tapered so as to increase in cross-section from its rear end. Towards its forward end the stock is split or divided lengthwise so as to have a lower forwardly projecting part 3 and an upper forwardly projecting part 4 which is shorter than part 3. These two parts are arranged to co-operate in such a manner as to permit a nib 5 (Fig. 6) to be slid lengthwise into position between them and to securely but detachably retain the nib in its operative position between the two parts.

For this purpose it is preferred that the rear portion 6 of the lower part 3 should be of approximately semi-circular or arch shape in cross section and terminate at opposite sides in horizontal steps or shoulders 7 so as to provide a rest or support which is complementary, or approximately complementary, to the shape and size of the rear part of the nib. In other words, the bowed rear part of the nib fits fairly closely over the semi-circular portion 6 of part 3, the side edges of the bowed portion rest upon the horizontal shoulders 7 while the rear extremity of the nib bears against a substantially vertical shoulder 8 which bridges the two side shoulders 7.

Intermediate its length the lower part 3 is preferably depresed or recessed as at 9 but its front end portion 11 is substantially level or flush with the rear portion and is intended to provide a rest or support for that portion of the nib adjacent the aperture at the rear of the longitudinal split or division. The said front end portion is preferably provided in its upper surface with a series of transverse grooves 12 for accommodating ink.

The foremost extremity of the upper part 4 of the stock is disposed about midway of the length of the depression or recess in the lower part 3 and said upper part 4 preferably terminates in a downturned lip 13 which is arranged so as to press upon the upper surface of a pen nib when it is inserted into operative position as indicated in Fig. 6. It will therefore be apparent that the nib will be securely but detachably retained in position, all objectionable wobbling of the nib being prevented. However, as a slight flexing movement may take place between the lower and upper projecting parts 3 and 4, an excessively rigid mounting of the nib is avoided and it will be found that the pen will write most efficiently with normal finger pressure and with great comfort to the writer.

As will appear from the drawings, the under surface of the forward part of the main body or stock 2 is flat while the upper surface of the stock may also be flat and the fore-part of the stock including the upper projecting part 4 may be of substantially increased width to constitute a flat finger-rest or platform which may be serrated or roughened to assist the writer in obtaining an effective grip of the pen-holder when in use.

While the pen-holder could be made of any suitable material, I consider it will be most beneficial to make it from plastic material, especially as the design permits it to be readily and very economically produced by straight-draw injection moulding.

Having now described my invention, what I claim as new and desire to secure by Letters Patent is:

1. An improved pen-holder comprising a stock which is T-shape in cross section and tapered so as to increase in cross section from its rear end toward its forward end and is split lengthwise towards its forward end so as to form a lower part and an upper part both of which are integral with said stock, said lower part projecting forwardly beyond said upper part, the rear portion of said lower part being arched shape in cross section and terminating at its opposite sides in longitudinally extending horizontal shoulders and at its rear in a transversely extending vertical shoulder which bridges said two horizontal shoulders, said upper part terminating at its front end in a downturned lip adapted to press downwardly upon the upper surface of a pen nib when the latter is operatively applied to the holder, and said lower part being provided in its upper surface and intermediately of its length with a recess, that portion of said lower part projecting forwardly from the recess being substantially flush with the portion projecting rearwardly thereof, and said downturned lip of said upper part extends transversely of and above said recess intermediate its length.

2. An improved pen-holder according to claim 1 wherein said upper part projects transversely at both sides of said stock so as to form a flat finger-rest or platform.

References Cited in the file of this patent

UNITED STATES PATENTS

| 449,295 | Reed | Mar. 31, 1891 |
| 881,215 | Wurdemann | Mar. 10, 1908 |
| 901,948 | Brown | Oct. 27, 1908 |
| 929,843 | Eklund | Aug. 3, 1909 |
| 1,807,445 | LaFrance | May 26, 1931 |

FOREIGN PATENTS

| 24,228 | Sweden | Feb. 22, 1908 |